US012595359B2

(12) United States Patent
Hashimoto et al.

(10) Patent No.: US 12,595,359 B2
(45) Date of Patent: Apr. 7, 2026

(54) RESIN COMPOSITION FOR FORMING OPTICAL COMPONENT, MOLDED PRODUCT, AND OPTICAL COMPONENT

(71) Applicant: MITSUI CHEMICALS, INC., Tokyo (JP)

(72) Inventors: Yuki Hashimoto, Ichihara (JP); Yasuyuki Soeda, Tokyo (JP); Hisahiro Kato, Ichihara (JP); Takayuki Okuno, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 1040 days.

(21) Appl. No.: 17/610,806

(22) PCT Filed: Apr. 24, 2020

(86) PCT No.: PCT/JP2020/017689

§ 371 (c)(1),
(2) Date: Nov. 12, 2021

(87) PCT Pub. No.: WO2020/230587

PCT Pub. Date: Nov. 19, 2020

(65) Prior Publication Data

US 2022/0213301 A1 Jul. 7, 2022

(30) Foreign Application Priority Data

May 14, 2019 (JP) ................................ 2019-091098

(51) Int. Cl.

*C08L 23/08* (2025.01)
*G02B 1/04* (2006.01)
*G02B 5/22* (2006.01)

(52) U.S. Cl.

CPC ................ *C08L 23/08* (2013.01); *G02B 1/04* (2013.01); *G02B 5/22* (2013.01)

(58) Field of Classification Search

CPC .............. C08L 23/08; G02B 1/04; G02B 5/22
See application file for complete search history.

(56) References Cited

U.S. PATENT DOCUMENTS

| | | | | |
|---|---|---|---|---|
| 2006/0292462 | A1 | 12/2006 | Seo et al. | |
| 2017/0022385 | A1 * | 1/2017 | Nowak | B29C 70/58 |
| 2019/0227207 | A1 | 7/2019 | Nagaya et al. | |

FOREIGN PATENT DOCUMENTS

| | | | |
|---|---|---|---|
| EP | 0578255 | A2 | 1/1994 |
| EP | 0661310 | A2 | 7/1995 |
| JP | H11-021433 | A | 1/1999 |
| JP | H11-352301 | A | 12/1999 |
| JP | 2000-026635 | A | 1/2000 |
| JP | 2006309266 | * | 11/2006 |
| JP | 3885850 | B2 | 12/2006 |
| KR | 10-0678840 | B1 | 2/2007 |
| WO | 2017213047 | A1 | 12/2017 |

OTHER PUBLICATIONS

Kreuder EP 0661310 A2 (EPO translation) (Year: 1995).*
Marzec, Polymer Testing 62 (2017) 392-401 (Year: 2017).*
Translation of JP2006309266 (Year: 2006).*

* cited by examiner

*Primary Examiner* — Robert C Boyle
(74) *Attorney, Agent, or Firm* — BUCHANAN INGERSOLL & ROONEY PC

(57) ABSTRACT

Provided is a resin composition for forming an optical component, the resin composition including a cyclic olefin-based polymer and an anthraquinone-based dye, in which the cyclic olefin-based polymer includes at least one selected from a copolymer of ethylene or an α-olefin and a cyclic olefin, and a ring-opening polymer of a cyclic olefin.

13 Claims, No Drawings

RESIN COMPOSITION FOR FORMING OPTICAL COMPONENT, MOLDED PRODUCT, AND OPTICAL COMPONENT

TECHNICAL FIELD

The present invention relates to a resin composition for forming an optical component, a molded product, and an optical component.

BACKGROUND ART

In recent years, utilization of 3D sensors or distance measuring sensors, which measure the shape or distance of an object, has been expanding as those sensors are being installed in smartphones and automobiles. These devices utilize near-infrared light, and visible light is detected as noise. Therefore, it is indispensable for these devices to have optical components that shield visible light and selectively transmit near-infrared light.

Conventionally, visible light cutoff filters have been widely used as such an optical component. A visible light cutoff filter is generally an optical component manufactured by laminating 10 or more layers of a dielectric substance having a predetermined thickness on a glass substrate, and is installed between a lens and a sensor. However, there is a problem that the manufacturing process is complicated and costly. Thus, for example, as described in Patent Document 1, a method of conveniently producing a visible light cutoff filter by applying a light-absorbing layer on a resin substrate has been proposed.

RELATED DOCUMENT

Patent Document

[Patent Document 1] Japanese Patent No. 3885850

SUMMARY OF THE INVENTION

Technical Problem

However, in the above-described method, when the substrate resin is exposed due to peeling of the light-absorbing layer or the like, there is a concern that the transmission characteristics may change significantly. In addition, especially in smartphones where low profile is strongly desired, there is a problem with the space for installing a visible light cutoff filter.

The present invention was made in view of the above-described circumstances, and it is an object of the invention to provide a resin composition for forming an optical component, with which it is possible to produce a molded product that does not require coating of a light-absorbing layer because a molded product itself formed from the resin composition has near-infrared selective transmission characteristics, the resin composition making it possible to obtain a molded product which has a higher refractive index compared to conventional cases and when used as a lens, is capable of reducing the thickness of the lens.

Solution to Problem

That is, according to the present invention, a resin composition, a molded product, and an optical component as disclosed below are provided.

[1] A resin composition for forming an optical component, the resin composition including a cyclic olefin-based polymer and an anthraquinone-based dye, in which the cyclic olefin-based polymer includes at least one selected from a copolymer of ethylene or an α-olefin and a cyclic olefin, and a ring-opening polymer of a cyclic olefin.

[2] The resin composition for forming an optical component according to [1], in which with regard to a molded product formed from the resin composition for forming an optical component and having a thickness of 1 mm, an average value of transmittance at a wavelength of 850 to 1000 nm is equal to or more than 85%, and an average value of transmittance at a wavelength of 300 to 600 nm is equal to or less than 1%.

[3] The resin composition for forming an optical component according to [1] or [2], in which with regard to a molded product formed from the resin composition for forming an optical component and having a thickness of 3 mm, a refractive index at a wavelength of 830 nm is equal to or more than 1.50 and equal to or less than 1.70 at a measurement temperature of 25° C.

[4] The resin composition for forming an optical component according to any one of [1] to [3], in which the anthraquinone-based dye includes an anthraquinone-based dye having a maximum absorption wavelength in a wavelength range of 550 to 800 nm.

[5] The resin composition for forming an optical component according to any one of [1] to [4], in which the anthraquinone-based dye includes a compound represented by the following General Formula (A1):

(A1)

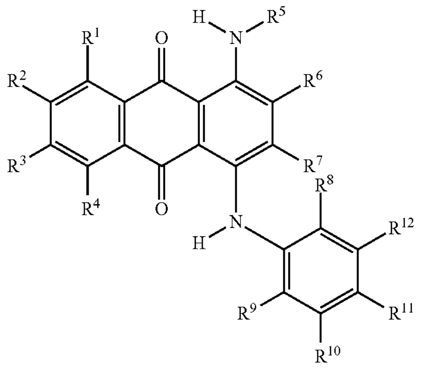

in General Formula (A1), $R^1$ to $R^{12}$ each independently represent a substituent, $R^1$ to $R^{12}$ may be the same as or different from each other and each represent a hydrogen atom, a halogen atom, an alkyl group having 1 to 20 carbon atoms, an alkyl halide group having 1 to 20 carbon atoms, a cycloalkyl group having 3 to 15 carbon atoms, an aromatic hydrocarbon group having 6 to 20 carbon atoms, a sulfo group, a sodium sulfonate group, benzenesulfonic acid, or a derivative thereof.

[6] The resin composition for forming an optical component according to [1] to [5], in which a content of the anthraquinone-based dye in the resin composition for forming an optical component is equal to or more than 500 ppm and equal to or less than 10000 ppm with respect to the resin composition for forming an optical component.

[7] The resin composition for forming an optical component according to any one of [1] to [6], in which a refractive index at a wavelength of 830 nm of a molded product formed from the resin composition for forming an optical component is higher by equal to or more than 0.00040 than a refractive index at a wavelength of 830 nm of a molded product formed from the cyclic olefin-based polymer.

[8] The resin composition for forming an optical component according to any one of [1] to [7], in which with regard to a molded product formed from the resin composition for forming an optical component and having a thickness of 1 mm, a transmittance at a wavelength of 850 nm is equal to or more than 20%.

[9] A molded product obtained by molding the resin composition for forming an optical component according to any one of [1] to [8].

[10] An optical component including the molded product according to [9].

[11] The optical component according to [10], in which the optical component is a lens, a prism, or a light guide plate.

[12] A resin composition for forming an optical component, the resin composition including a resin and an anthraquinone-based dye, in which the resin includes at least one selected from a cyclic olefin-based polymer, a polycarbonate, an acrylic resin, and a polyester, with regard to a molded product formed from the resin composition for forming an optical component and having a thickness of 1 mm, an average value of transmittance at a wavelength of 850 to 1000 nm is equal to or more than 85%, and an average value of transmittance at a wavelength of 300 to 600 nm is equal to or less than 1%, and with regard to a molded product formed from the resin composition for forming an optical component and having a thickness of 3 mm, a refractive index at a wavelength of 830 nm is equal to or more than 1.50 and equal to or less than 1.70 at a measurement temperature of 25° C.

Advantageous Effects of Invention

According to the present invention, there can be provided a resin composition, with which it is possible to produce a molded product that does not require coating of a light-absorbing layer because the molded product itself has near-infrared selective transmission characteristics, the resin composition making it possible to obtain a molded product which has a higher refractive index compared to conventional cases and has excellent heat resistance, moist heat resistance, and ultraviolet resistance in a well-balanced manner, and in which a decrease in a visible light shielding effect and a decrease in the near-infrared transmittance are suppressed; a molded product formed from the resin composition; and an optical component.

DESCRIPTION OF EMBODIMENTS

Hereinafter, embodiments of the present invention will be described in detail.

In the present specification, the notation “a to b” in the description of a numerical value range indicates that the range is equal to or more than a and equal to or less than b, unless particularly stated otherwise. For example, “1 to 5% by mass” means “equal to or more than 1% by mass and equal to or less than 5% by mass”.

A resin composition for forming an optical component according to a first embodiment of the present invention includes a cyclic olefin-based polymer and an anthraquinone-based dye. Furthermore, the cyclic olefin-based polymer according to the present embodiment includes at least one selected from a copolymer of ethylene or an α-olefin and a cyclic olefin, and a ring-opening polymer of a cyclic olefin.

Since the resin composition for forming an optical component according to the present embodiment includes a cyclic olefin-based polymer and an anthraquinone-based dye and includes at least one selected from a copolymer of ethylene or an α-olefin and a cyclic olefin, and a ring-opening polymer of a cyclic olefin as the cyclic olefin-based polymer, near-infrared selective transmission characteristics can be imparted to a molded product itself formed from the resin composition for forming an optical component, and the molded product becomes a molded product that shields visible light without requiring coating of a light-absorbing layer and can selectively transmit near-infrared light.

Furthermore, according to the resin composition for forming an optical component according to the present embodiment, a molded product having a higher refractive index than that of a conventional one. Therefore, for example, when a molded product formed from the resin composition for forming an optical component according to the present embodiment is used as a lens, the thickness of the lens can be reduced, and space saving and weight reduction can be promoted.

Furthermore, according to an investigation conducted by the inventors of the present invention, it was found that in the related art, with regard to a resin composition for forming an optical component, when an attempt is made to impart near-infrared selective transmission characteristics to the resin composition for forming an optical component and a molded product formed from the resin composition for forming an optical component, color unevenness may occur in the resin composition for forming an optical component or the molded product; however, according to the present invention, color unevenness occurring in the resin composition for forming an optical component and the molded product can be suppressed.

Furthermore, according to the present invention, it is possible to provide a resin composition for forming an optical component, the resin composition making it possible to obtain an optical component which has excellent heat resistance, moist heat resistance, and ultraviolet resistance in addition to the above-mentioned effects, and in which a decrease in a visible light shielding effect and a decrease in the near-infrared transmittance are suppressed.

Hereinafter, each component included in the resin composition for forming an optical component according to the present embodiment will be specifically described.

(Cyclic Olefin-Based Polymer)

The cyclic olefin-based polymer is a polymer having a repeating unit derived from a cyclic olefin as an essential constituent unit.

The cyclic olefin-based polymer according to the present embodiment includes at least one selected from a copolymer of ethylene or an α-olefin and a cyclic olefin, and a ring-opening polymer of a cyclic olefin.

An example of the cyclic olefin-based polymer according to the present embodiment may be the polymer (A) described in Japanese Unexamined Patent Publication No. 2009-120794, and the cyclic olefin-based polymer according to the present embodiment can include a cyclic olefin-based polymer having a constituent unit (a) derived from a cyclic olefin having an alicyclic structure and represented by the following Chemical Formula [I], Chemical Formula [II], or Chemical Formula [III].

The constituent unit (a) is preferably derived from a cyclic olefin represented by the following Chemical Formula [I], Chemical Formula [II], or Chemical Formula [III].

[I]

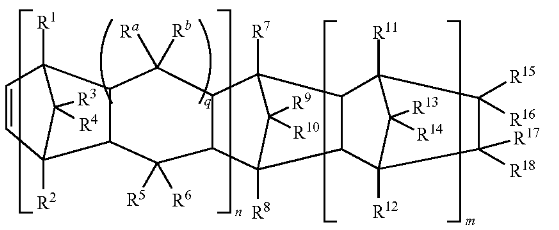

In the Formula [I], n represents 0 or 1; m represents 0 or a positive integer; and q represents 0 or 1. When q is 1, $R^a$ and $R^b$ each independently represent the following atom or hydrocarbon group, and when q represents 0, the respective linking bonds are bonded to form a 5-membered ring.

$R^1$ to $R^{18}$ and $R^a$ and $R^b$ each independently represent a hydrogen atom, a halogen atom, or a hydrocarbon group which may be substituted with a halogen atom. Here, the halogen atom is a fluorine atom, a chlorine atom, a bromine atom, or an iodine atom.

Furthermore, the hydrocarbon groups may be each independently, for example, an alkyl group having 1 to 20 carbon atoms, a cycloalkyl group having 3 to 15 carbon atoms, or an aromatic hydrocarbon group. More specifically, examples of the alkyl group include a methyl group, an ethyl group, a propyl group, an isopropyl group, an amyl group, a hexyl group, an octyl group, a decyl group, a dodecyl group, and an octadecyl group; examples of the cycloalkyl group include a cyclohexyl group; and examples of the aromatic hydrocarbon group include a phenyl group and a naphthyl group. These hydrocarbon groups may be substituted with halogen atoms.

In addition, with regard to the above-described Formula [I], $R^{15}$ to $R^{18}$ may be bonded to each other (in cooperation with each other) to form a monocyclic ring or a polycyclic ring, and a monocyclic ring or a polycyclic ring thus formed may have a double bond. Here, specific examples of the monocyclic ring or the polycyclic ring to be formed will be shown below.

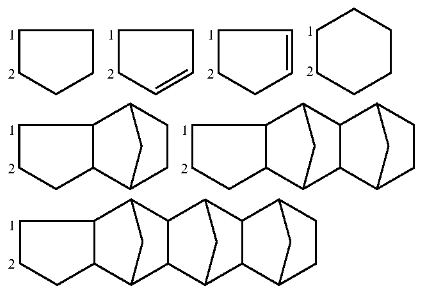

In the above-described examples, the carbon atoms assigned with number 1 or 2 represent carbon atoms to which $R^{15}$ ($R^{16}$) or $R^{17}$ ($R^{18}$) is bonded, respectively, in Formula [I]. Furthermore, the carbon atoms may each form an alkylidene group with $R^{15}$ and $R^{16}$ or with $R^{17}$ and $R^{18}$. Such an alkylidene group is usually an alkylidene group having 2 to 20 carbon atoms, and specific examples of such an alkylidene group include an ethylidene group, a propylidene group, and an isopropylidene group.

[II]

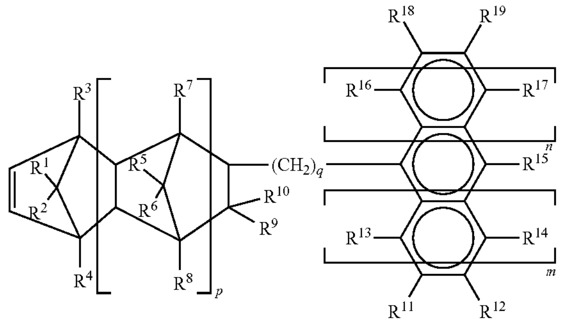

In the Formula [II], p and q each represent 0 or a positive integer, and m and n each represent 0, 1, or 2. Furthermore, $R^1$ to $R^{19}$ each independently represent a hydrogen atom, a halogen atom, or a hydrocarbon group or an alkoxy group, both of which may be substituted with a halogen atom.

The halogen atom has the same meaning as the halogen atom for the above-described Formula [I]. The hydrocarbon groups may be each independently an alkyl group having 1 to 20 carbon atoms, an alkyl halide group having 1 to 20 carbon atoms, a cycloalkyl group having 3 to 15 carbon atoms, or an aromatic hydrocarbon group. More specifically, examples of the alkyl group include a methyl group, an ethyl group, a propyl group, an isopropyl group, an amyl group, a hexyl group, an octyl group, a decyl group, a dodecyl group, and an octadecyl group; examples of the cycloalkyl group include a cyclohexyl group; and examples of the aromatic hydrocarbon group include an aryl group and an aralkyl group, specifically such as a phenyl group, a tolyl group, a naphthyl group, a benzyl group, and a phenylethyl group. Examples of the alkoxy group include a methoxy group, an ethoxy group, and a propoxy group. These hydrocarbon groups and alkoxy groups may be substituted with a fluorine atom, a chlorine atom, a bromine atom, or an iodine atom.

Here, the carbon atom to which $R^9$ and $R^{10}$ are bonded may be bonded to the carbon atom to which $R^{13}$ is bonded or to the carbon atom to which $R^{11}$ is bonded, directly or through an alkylene group having 1 to 3 carbon atoms. That is, in a case where the above-described two carbon atoms are bonded through an alkylene group, the groups represented by $R^9$ and RE or the groups represented by $R^{10}$ and $R^{11}$ form, in cooperation with each other, any one alkylene group among a methylene group ($—CH_2—$), an ethylene group ($—CH_2CH_2—$), or a propylene group ($—CH_2CH_2CH_2—$). Furthermore, in a case of n=m=0, $R^{15}$ and $R^{12}$ or $R^{15}$ and $R^{19}$ may be bonded to each other to form a monocyclic or polycyclic aromatic ring. Examples of the monocyclic or polycyclic aromatic ring in this case include groups in which $R^{15}$ and $R^{12}$ or $R^{15}$ and $R^{19}$ further form an aromatic ring in the case of n=m=0, as described below.

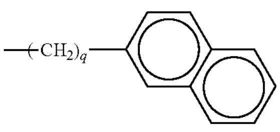

-continued

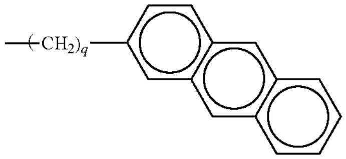

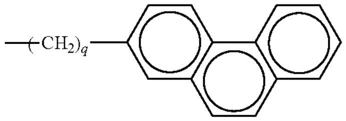

Here, q has the same meaning as q in Formula [II].

[III]

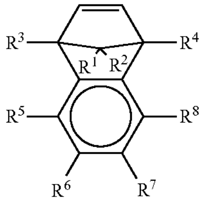

In Chemical Formula [III], $R^1$ to $R^8$ each independently represent a hydrogen atom or a hydrocarbon group; $R^5$ and $R^6$, $R^6$ and $R^7$, and $R^7$ and $R^8$ may be bonded to each other to form a monocyclic ring; and the monocyclic ring may have a double bond.

In the above-described Formula [III], it is preferable that $R^1$ to $R^8$ each independently represent a hydrogen atom or a hydrocarbon group having 4 or fewer carbon atoms, and examples of the hydrocarbon group having 4 or fewer carbon atoms include alkyl groups such as a methyl group, an ethyl group, a propyl group, an isopropyl group, an n-butyl group, and an isobutyl group; and cycloalkyl groups such as a cyclopropyl group.

Examples of the cyclic olefin represented by the above-described Formula [I], [II], or [III] will be more specifically shown below.

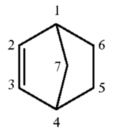

Bicyclo[2.2.1]-2-heptene represented by the above-described formula (in the formula, numbers 1 to 7 represent carbon position numbers), and derivatives obtained by substituting bicyclo[2.2.1]-2-heptene with, for example, a halogen atom or a hydrocarbon group which may be substituted with a halogen atom. This halogen atom has the same meaning as the halogen atom in the Formula [I], and examples of the hydrocarbon group include 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tolyl, 5-(ethylphenyl), 5-(isopropylphenyl), 5-(biphenyl), 5-(beta-naphthyl), 5-(alpha-naphthyl), 5-(anthracenyl), and 5,6-diphenyl. These hydrocarbon groups may be substituted with a fluorine atom, a chlorine atom, a bromine atom, or an iodine atom.

Furthermore, other examples of the derivatives include bicyclo[2.2.1]-2-heptene derivatives such as a cyclopentadiene-acenaphthylene adduct, 1,4-methano-1,4,4a,9a-tetrahydrofluorene, and 1,4-methano-1,4,4a,5,10,10a-hexahydroanthracene.

Tricyclo[4.3.0.$1^{2,5}$]-3-decene derivatives such as tricyclo[4.3.0.$1^{2,5}$]-3-decene, 2-methyltricyclo[4.3.0.$1^{2,5}$]-3-decene, and 5-methyltricyclo[4.3.0.$1^{2,5}$]-3-decene; and tricyclo[4.4.0.$1^{2,5}$]-3-undecene derivatives such as tricyclo[4.4.0.$1^{2,5}$]-3-undecene and 10-methyltricyclo[4.4.0.$1^{2,5}$]-3-undecene.

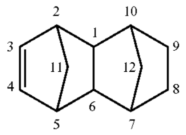

Tetracyclo[4.4.0.$1^{2,5}$.$1^{7,10}$]-3-dodecene represented by the above-described formula (in the formula, numbers 1 to 12 represent carbon position numbers), and derivatives obtained by substituting this with a hydrocarbon group. Examples of this hydrocarbon group include 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9-methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro, 8-bromo, 8-fluoro, 8,9-dichloro, 8-phenyl, 8-methyl-8-phenyl, 8-benzyl, 8-tolyl, 8-(ethylphenyl), 8-(isopropylphenyl), 8,9-diphenyl, 8-(biphenyl), 8-(beta-naphthyl), 8-(alpha-naphthyl), 8-(anthracenyl), and 5,6-diphenyl.

Still other examples of the derivatives include an adduct of (cyclopentadiene-acenaphthylene adduct) and cyclopentadiene. Pentacyclopentadecadiene compounds such as pentacyclo[6.5.1.$1^{3,6}$.$0^{2,7}$.$0^{9,13}$]-4-pentadecene and derivatives thereof, pentacyclo[7.4.0.$1^{2,5}$.$1^{9,12}$.$0^{8,13}$]-3-pentadecene and derivatives thereof, and pentacyclo[6.5.1.$1^{3,6}$.$0^{2,7}$.$0^{9,13}$]-4,10-pentadecadiene; pentacyclo[8.4.0.$1^{2,5}$.$1^{9,12}$.$0^{8,13}$]-3-hexadecene and derivatives thereof, pentacyclo[6.6.1.$1^{3,6}$.$0^{2,7}$.$0^{9,14}$]-4-hexadecene and derivatives thereof, hexacyclo[6.6.1.$1^{3,6}$.$1^{10,13}$.$0^{2,7}$.$0^{9,14}$]-4-heptadecene and derivatives thereof, heptacyclo[8.7.0.$1^{2,9}$.$1^{4,7}$.$1^{11,17}$.$0^{3,8}$.$0^{12,16}$]-5-eicosene and derivatives thereof, heptacyclo[8.8.0.$1^{2,9}$.$1^{4,7}$.$1^{11,18}$.$0^{3,8}$.$0^{12,17}$]-5-heneicosene and derivatives thereof, octacyclo[8.8.0.$1^{2,9}$.$1^{4,7}$.$1^{11,18}$.$1^{13,16}$.$0^{3,8}$.$0^{12,17}$]-5-docosene and derivatives thereof, nonacyclo[10.9.1.$1^{4,7}$.$1^{13,20}$.$1^{15,18}$.$0^{2,10}$.$0^{3,8}$.$0^{12,21}$.$0^{14,19}$]-5-pentacosene and derivatives thereof, and nonacyclo[10.10.1.$1^{5,8}$.$1^{14,21}$.$1^{16,19}$.$0^{2,11}$.$0^{4,9}$.$0^{13,22}$.$0^{15,20}$]-6-hexacosene and derivatives thereof may be mentioned.

Further examples of the derivatives include a cyclopentadiene-benzyne adduct (referred to as benzonorbornadiene) and derivatives obtained by substituting the adduct with a hydrocarbon group.

Specific examples of the cyclic olefins represented by General Formula [I], [II], or [III] have been described above, and more specific structural examples of these compounds include the structural examples of cyclic olefins shown in paragraph numbers [0038] to [0058] of the original specification of Japanese Unexamined Patent Publication No. H06-228380, and the structural examples of cyclic olefins shown in paragraph numbers [0027] to [0029] of the original specification of Japanese Unexamined Patent Publication No. 2005-330465. The cyclic olefin-based polymer according to the present embodiment may contain two or more kinds of units derived from the above-described cyclic olefins.

The cyclic olefin represented by the above-described Formula [I], [II], or [III], can be manufactured by subjecting olefins having a structure corresponding to cyclopentadiene to a Diels-Alder reaction. Such a cyclic monomer obtained by the Diels-Alder reaction is usually obtained as an isomer mixture of an endo form and an exo form; however, the endo form is mainly produced. However, the concentration of the exo form in the isomer mixture can be increased by a conventionally known method, for example, the method described in Japanese Unexamined Patent Publication No. H05-86131. According to this, the cyclic olefin can be used after adjusting the ratio of the endo form/exo form of the cyclic monomer to the extent that the purpose of the present invention is not impaired.

Furthermore, for example, benzonorbornadiene (hereinafter, sometimes referred to as BNBD) and derivatives thereof can be manufactured by a conventionally known method, for example, the method described in GB2244276. For example, BNBD can be obtained by reacting cyclopentadiene with 2-aminobenzoic acid in the presence of 1,2-dimethoxyethane.

Among the above-described compounds, the cyclic olefin-based polymer according to the present embodiment is preferably a norbornene-based polymer obtained by polymerizing norbornene monomers, which include a structural unit derived from a monomer having a norbornene skeleton. Specific examples of the norbornene monomer will be described later.

[Copolymer of Ethylene or α-Olefin and Cyclic Olefin]

As described above, the cyclic olefin-based polymer according to the present embodiment includes at least one selected from a copolymer of ethylene or an α-olefin and a cyclic olefin, and a ring-opening polymer of a cyclic olefin, and it is preferable that the cyclic olefin-based polymer includes a copolymer of ethylene or an α-olefin and a cyclic olefin.

Regarding the copolymer of ethylene or an α-olefin and a cyclic olefin, for example, the polymer described in paragraphs 0030 to 0123 of Pamphlet of WO 2008/047468 and the cyclic olefin-based polymer described in Japanese Unexamined Patent Publication No. 2016-8236 can be used.

The copolymer may be, for example, a polymer having an alicyclic structure in at least a portion of repeating structural units (hereinafter, also simply referred to as "polymer having an alicyclic structure"), the polymer having an alicyclic structure in at least a portion of the repeating units of the polymer, and specifically, it is preferable that the polymer includes a polymer having one kind or two or more kinds of structures represented by the following General Formula (1):

(1)

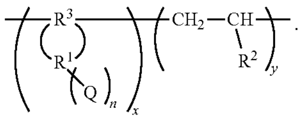

In Formula (1), x and y represent copolymerization ratios and are real numbers satisfying the condition: $0/100 \leq y/x \leq 95/5$; x and y are on a molar basis;

n represents the number of substitutions of the substituent group Q, which is a real number satisfying the condition: $0 \leq n \leq 2$;

$R^1$ represents one kind or two or more kinds of groups having a valence of 2+n selected from the group consisting of hydrocarbon groups having 2 to 20 carbon atoms, and preferably 2 to 12 carbon atoms; $R^2$ represents a hydrogen atom or one kind or two or more kinds of monovalent groups selected from the group consisting of hydrocarbon groups having 1 to 10 carbon atoms; $R^3$ represents one kind or two or more kinds of tetravalent groups selected from the group consisting of hydrocarbon groups having 2 to 10 carbon atoms, and preferably 2 to 5 carbon atoms;

Q represents $COOR^d$ ($R^d$ represents a hydrogen atom or a monovalent group selected from the group consisting of hydrocarbon groups having 1 to 10 carbon atoms); and each of $R^1$, $R^2$, $R^3$, and Q may be one kind or may have two or more kinds at any ratio.

For each symbol in the above-described Formula (1), the following preferable conditions can be mentioned, and these conditions are used in combination as necessary.

[1] $R^1$ represents a group having at least one ring structure in the structure.

[2] When n=0, $R^3$ represents the following exemplary structure (a), (b), or (c):

(a)

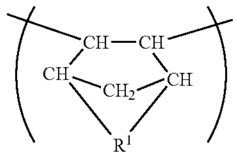

(b)

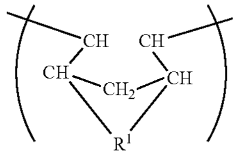

(c)

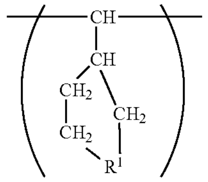

In the Formula (a) to Formula (c), $R^1$ represents the same as Formula (1).

[3] n represents 0.

[4] y/x represents a real number that satisfies the condition: $20/80 \leq y/x \leq 65/35$.

[5] $R^2$ represents a hydrogen atom and/or $-CH_3$.

[6] Q represents $-COOH$ or a $-COOCH_3$ group.

The cyclic olefin-based polymer used in the present embodiment is more preferably a polymer having one kind or two or more kinds of structures represented by the following Formula (2):

(2)

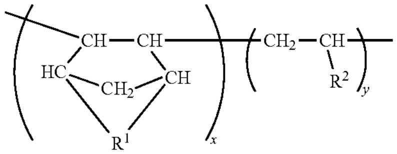

In the Formula (2), $R^1$ represents one kind or two or more kinds of divalent groups selected from the group consisting of hydrocarbon groups having 2 to 20 carbon atoms, and preferably 2 to 12 carbon atoms.

$R^2$ represents a hydrogen atom or one kind or two or more kinds of monovalent groups selected from the group consisting of hydrocarbon groups having 1 to 10 carbon atoms.

In the Formula (2), x and y represent copolymerization ratios and are real numbers satisfying the condition: $5/95 \leq y/x \leq 95/5$. The condition is preferably $50/50 \leq y/x \leq 95/5$, and more preferably $55/45 \leq y/x \leq 80/20$. x and y are on a molar basis.

For each symbol in the Formula (2), the following preferred conditions can be mentioned, and these conditions are used in combination as necessary.

[1] $R^1$ group is a divalent group represented by the following Formula (3):

(3)

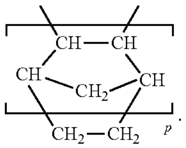

In the Formula (3), p represents an integer of 0 to 2. Preferably, the group is a divalent group in which p is 1 in the above-described Formula (3).

[2] $R^2$ represents a hydrogen atom.

Examples of ethylene or the α-olefin include ethylene, propylene, and butene-1; however, ethylene is preferred.

Examples of the cyclic olefin include cyclic olefins represented by the above-described General Formulae [I], [II], and [III], and the cyclic olefin is preferably one kind or two or more kinds selected from the group consisting of, for example, bicyclo[2.2.1]-2-heptene, tetracyclo[$4.4.0.1^{2,5}.1^{7,10}$]-3-dodecene, 1,4-methano-1,4,4a, 9a-tetrahydrofluorene, a cyclopentadiene-benzyne adduct, and a cyclopentadiene-acenaphthylene adduct; and more preferably at least one selected from bicyclo[2.2.1]-2-heptene and tetracyclo [$4.4.0.1^{2,5}.1^{7,10}$]-3-dodecene.

The copolymer of ethylene or an α-olefin and a cyclic olefin according to the present embodiment may have a repeating structural unit derived from another copolymerizable monomer to the extent that favorable physical properties of the resin composition according to the present embodiment, a molded product obtainable from the resin composition, and the like are not impaired. The copolymerization ratio is not particularly limited, but the copolymerization ratio of the repeating structural unit derived from a monomer other than ethylene or the α-olefin and the cyclic olefin is preferably equal to or less than 20 mol %, and more preferably equal to or less than 10 mol %, when the cyclic olefin-based polymer is designated as 100 mol %. When the copolymerization ratio is equal to or less than the above-described upper limit value, the optical physical properties and the like of the resulting resin composition and a molded product obtainable from the resin composition can be further improved, and optical components with higher precision can be obtained.

Examples of other copolymerizable monomers include aromatic vinyl compounds. The aromatic vinyl compounds include styrene and derivatives thereof. A styrene derivative is a compound in which another group is bonded to styrene, and examples include alkylstyrenes such as o-methylstyrene, m-methylstyrene, p-methylstyrene, 2,4-dimethylstyrene, o-ethylstyrene, and p-ethylstyrene; substituted styrenes in which a hydroxyl group, an alkoxy group, a carboxyl group, an acyloxy group, a halogen, and the like have been introduced into the benzene nucleus of styrene, such as hydroxystyrene, t-butoxystyrene, vinylbenzoic acid, vinylbenzyl acetate, o-chlorostyrene, and p-chlorostyrene; and vinylbiphenyl-based compounds such as 4-vinylbiphenyl and 4-hydroxy-4'-vinylbiphenyl.

Among these, from the viewpoint of the optical characteristics of the resulting molded product, a monomer having a benzene ring unit is preferred, and for example, styrene and derivatives thereof are preferred.

The type of copolymer of the copolymer of ethylene or an α-olefin and a cyclic olefin according to the present embodiment is not particularly limited; however, various known types of copolymer such as a random copolymer, a block copolymer, and an alternating copolymer can be applied. Among those, a random copolymer is preferable.

Regarding the resin composition for forming an optical component according to the present embodiment, when the amount of birefringence of a molded product obtained by molding the resin composition is reduced, it is preferable that the resin composition includes a copolymer of ethylene or an α-olefin and a cyclic olefin, in which the amount of birefringence of the cyclic olefin-based polymer itself is smaller. The amount of birefringence as used herein is a phase difference measured at a wavelength of 850 nm for a molded product having a thickness of 1 mm.

[Ring-Opening Polymer of Cyclic Olefin]

As described above, the cyclic olefin-based polymer according to the present embodiment includes at least one selected from a copolymer of ethylene or an α-olefin and a cyclic olefin, and a ring-opening polymer of a cyclic olefin. Hereinafter, the ring-opening polymer of a cyclic olefin will be described.

Examples of the ring-opening polymer of a cyclic olefin include a ring-opening polymer of a norbornene monomer, a ring-opening polymer of a norbornene monomer and another monomer capable of ring-opening copolymerization with the norbornene monomer, and hydrides of these, and for example, the norbornene-based polymer described in Japanese Patent No. 6256353 may be mentioned.

Examples of the norbornene monomer include a norbornene-based monomer, a tetracyclododecene-based monomer, a dicyclopentadiene-based monomer, and a methanotetrahydrofluorene-based monomer.

Examples of the norbornene-based monomer include bicyclo[2.2.1]hept-2-ene (trivial name: norbornene), 5-methyl-bicyclo[2.2.1]hept-2-ene, 5,5-dimethyl-bicyclo [2.2.1]hept-2-ene, 5-ethyl-bicyclo[2.2.1]hept-2-ene, 5-ethylidene-bicyclo[2.2.1]hept-2-ene, 5-Vinyl-bicyclo[2.2.1] hept-2-ene, 5-propenylbicyclo[2.2.1]hept-2-ene, 5-methoxycarbonyl-bicyclo[2.2.1]hept-2-ene, 5-cyanobicyclo[2.2.1]hept-2-ene, and 5-methyl 5-methoxycarbonyl-bicyclo[2.2.1]hept-2-ene.

Examples of the tetracyclododecene-based monomer include tetracyclo[$4.4.0.1^{2,5}.1^{7,10}$]-3-dodecene (tetracyclododecene), tetracyclo[4.4.0.$1^{2,5}$.$1^{7,10}$]-3-dodecene, 8-methyltetracyclo[4.4.0.$1^{2,5}$.$1^{7,10}$]-3-dodecene, 8-ethyltetracyclo[4.4.0.$1^{2,5}$.$1^{7,10}$]-3-dodecene, 8-ethylidenetetracyclo[4.4.0.$1^{2,5}$.$1^{7,10}$]-3-dodecene, 8,9-dimethyltetracyclo[4.4.0.$1^{2,5}$.$1^{7,10}$]-3-dodecene, 8-ethyl-9-methyltetracyclo[4.4.0.$1^{2,5}$.$1^{7,10}$]-3-dodecene, 8-ethylidene-9-methyltetracyclo[4.4.0.$1^{2,5}$.$1^{7,10}$]-3-dodecene, and 8-methyl-8-carboxymethyltetracyclo[4.4.0.$1^{2,5}$.$1^{7,10}$]-3-dodecene.

Examples of the dicyclopentadiene-based monomer include tricyclo[4.3.$0^{1,6}$.$1^{2,5}$]deca-3,7-diene (trivial name: dicyclopentadiene), 2-methyldicyclopentadiene, and 2,3-dimethyldicyclopentadiene, and 2,3-dihydroxydicyclopentadiene.

Examples of the methanotetrahydrofluorene-based monomer include 7,8-benzotricyclo[4.3.0.$1^{2,5}$]dec-3-ene (trivial name: methanotetrahydrofluorene: also referred to as 1,4-methano-1,4,4a,9a-tetrahydrofluorene), 1,4-methano-8-methyl-1,4,4a,9a-tetrahydrofluorene, 1,4-methano-8-chloro-1,4,4a,9a-tetrahydrofluorene, and 1,4-methano-8-bromo-1,4,4a,9a-tetrahydrofluorene.

As the norbornene monomer, at least one or more selected from, for example, bicyclo[2.2.1]hept-2-ene (trivial name: norbornene) and derivative thereof (having a substituent on the ring), tricyclo[4.3.$0^{1,6}$.$1^{2,5}$]deca-3,7-diene (trivial name: dicyclopentadiene) and derivatives thereof, 7,8-benzotricyclo[4.3.0.$1^{2,5}$]dec-3-ene (trivial name: methanotetrahydrofluorene: also referred to as 1,4-methano-1,4,4a,9a-tetrahydrofluorene) and derivatives thereof, tetracyclo[4.4.0.$1^{2,5}$.$1^{7,10}$]-3-dodecene (trivial name: tetracyclododecene) and derivatives thereof may be preferably mentioned.

Examples of the substituent substituted on the ring of these derivatives include an alkyl group, an alkylene group, a vinyl group, an alkoxycarbonyl group, an alkylidene group, and the like. The norbornene monomer may have one or two or more substituents.

These norbornene monomers are used singly or in combination of two or more kinds thereof.

A ring-opening polymer of a norbornene monomer, or a ring-opening polymer of a norbornene monomer and another monomer capable of ring-opening copolymerization with the norbornene monomer can be obtained by polymerizing the monomer components in the presence of a known ring-opening polymerization catalyst. Examples of the ring-opening polymerization catalyst include a catalyst composed of a halide of a metal such as ruthenium or osmium, a nitrate or acetylacetone compound, and a reducing agent; and a catalyst composed of a halide or an acetylacetone compound of a metal such as titanium, zirconium, tungsten, or molybdenum, and an organoaluminum compound.

Furthermore, examples of the other monomer capable of ring-opening copolymerization with a norbornene monomer include monocyclic cyclic olefin monomers such as cyclohexene, cycloheptene, and cyclooctene.

A hydride of a ring-opening polymer of a norbornene-based monomer can be generally obtained by adding a known hydrogenation catalyst containing a transition metal such as nickel or palladium to a polymerization solution of the ring-opening polymer and hydrogenating carbon-carbon unsaturated bonds.

The cyclic olefin-based polymer according to the present embodiment is such that when the entire amount of the cyclic olefin-based polymer is designated as 100 mol %, the content of a structural unit derived from an aromatic ring-containing monomer in the cyclic olefin-based polymer is preferably less than 70 mol %, more preferably equal to or less than 50 mol %, even more preferably equal to or less than 30 mol %, and particularly preferably equal to or less than 10 mol %. The lower limit of the content of the structural unit derived from an aromatic ring-containing monomer included in the cyclic olefin-based polymer according to the present embodiment is, for example, equal to or more than 0 mol %. That is, the cyclic olefin-based polymer according to the present embodiment may not contain a structural unit derived from an aromatic ring-containing monomer in the cyclic olefin-based polymer.

(Polar Group-Containing Cyclic Olefin-Based Polymer (X))

The cyclic olefin-based polymer according to the present embodiment includes at least one selected from a copolymer of ethylene or an α-olefin and a cyclic olefin, and a ring-opening polymer of a cyclic olefin, and can also include a cyclic olefin-based polymer other than the copolymer of ethylene or an α-olefin and a cyclic olefin and the ring-opening polymer of a cyclic olefin.

As an example, the cyclic olefin-based polymer according to the present embodiment may include a modified polar group-containing cyclic olefin-based polymer (X) obtained by modifying a cyclic olefin-based polymer with a polar group. Examples of such a polar group-containing cyclic olefin-based polymer (X) include a copolymer obtained by grafting or graft-polymerizing a monomer having a polar group to a cyclic olefin-based polymer, and a copolymer of a cyclic olefin and a monomer having a polar group.

(Anthraquinone-Based Dye)

The resin composition for forming an optical component according to the present embodiment includes an anthraquinone-based dye. The resin composition for forming an optical component according to the present embodiment can include one kind or two or more kinds of anthraquinone-based dyes. Furthermore, it is preferable that the anthraquinone-based dye according to the present embodiment includes an anthraquinone-based dye whose maximum absorption wavelength is in the wavelength range of 550 to 800 nm.

It is preferable that the resin composition for forming an optical component according to the present embodiment includes a blue-colored anthraquinone-based dye and/or a green-colored anthraquinone-based dye.

Here, when the resin composition for forming an optical component according to the present embodiment includes a blue-colored anthraquinone-based dye, the maximum absorption wavelength of the blue-colored anthraquinone-based dye is preferably in the wavelength range of 550 to 700 nm, and more preferably in the wavelength range of 550 to 600 nm.

When the resin composition for forming an optical component according to the present embodiment includes a green-colored anthraquinone-based dye, the maximum absorption wavelength of the green-colored anthraquinone-based dye is preferably in the wavelength range of 600 to 800 nm, and more preferably in the wavelength range of 650 to 750 nm.

It is preferable that the anthraquinone-based dye according to the present embodiment includes a compound represented by the following General Formula (A1):

(A1)

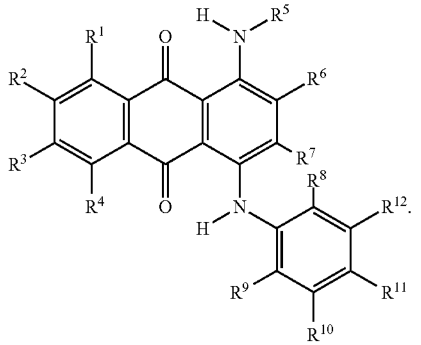

In General Formula (A1), $R^1$ to $R^{12}$ each independently represent a substituent. $R^1$ to $R^{12}$ may be the same as or different from each other and each represent a hydrogen atom, a halogen atom, an alkyl group having 1 to 20 carbon atoms, an alkyl halide group having 1 to 20 carbon atoms, a cycloalkyl group having 3 to 15 carbon atoms, an aromatic hydrocarbon group having 6 to 20 carbon atoms, a sulfo group, a sodium sulfonate group, benzenesulfonic acid, or a derivative thereof.

Specific examples of the anthraquinone-based dye according to the present embodiment include sodium 2-[[9,10-dihydro-4-methylamino-9,10-dioxoanthracen-1-yl]amino]-5-methyl benzenesulfonate, 1,4-bis(p-toluidino)anthraquinone, 1,4-bis(2-sodiosulfo-4-methylanilino)anthraquinone, 1,4-bis[2-(sodiosulfo)-4-butylanilino]-9,10-anthraquinone, 5,8-bis(p-butylanilino)-1,4-dihydroxyanthraquinone, and 1-methylamino-4-[(3-methylphenyl)amino]-9,10-anthraquinone.

As the resin composition for forming an optical component according to the present embodiment includes the anthraquinone-based dye of the above-described embodiment, a resin composition for forming an optical component, which has superior visible light absorption properties and high near-infrared transmissibility and also has an excellent effect of increasing the refractive index, is obtained.

The resin composition for forming an optical component according to the present embodiment may include a dye other than the anthraquinone-based dye in addition to the anthraquinone-based dye, and specific examples thereof include an azo-based dye.

The resin composition for forming an optical component according to the present embodiment is such that when the sum of contents of the anthraquinone-based dye and the dye other than the anthraquinone-based dye included in the resin composition for forming an optical component is designated as 100 parts by mass, the content of the anthraquinone-based dye included in the resin composition for forming an optical component is preferably equal to or more than 30 parts by mass and equal to or less than 100 parts by mass, more preferably equal to or more than 50 parts by mass and equal to or less than 100 parts by mass, and particularly preferably equal to or more than 60 parts by mass and equal to or less than 100 parts by mass.

By setting the amount of the anthraquinone-based dye in the total amount of dyes included in the resin composition for forming an optical component to be in the above-described value range, a resin composition for forming an optical component, with which it is possible to obtain a molded product having less color unevenness and an excellent effect of increasing the refractive index, is obtained.

The resin composition for forming an optical component according to the present embodiment is such that the content of the anthraquinone-based dye in the resin composition for forming an optical component is preferably equal to or more than 500 ppm and equal to or less than 10000 ppm, more preferably equal to or more than 800 ppm and equal to or less than 8000 ppm, and even more preferably equal to or more than 900 ppm and equal to or less than 4000 ppm, with respect to the resin composition for forming an optical component.

(Other Components)

In the resin composition for forming an optical component according to the present embodiment, if necessary, known additives can be incorporated as optional components, to the extent that favorable physical properties of the resin composition for forming an optical component according to the present embodiment and a molded product thereof are not impaired. Regarding the additives, for example, a phenolic stabilizer, a higher fatty acid metal salt, an oxidation inhibitor, an ultraviolet absorber, a hindered amine-based light stabilizer, a hydrochloric acid absorbent, a metal inactivator, an antistatic agent, an antifogging agent, a lubricating agent, a slip agent, a nucleating agent, a plasticizer, a flame retardant, and a phosphorus-based stabilizer can be incorporated to the extent that the purpose of the present invention is not impaired, and the blending proportions thereof are appropriate amounts.

The total content of the cyclic olefin-based polymer and dyes including the anthraquinone-based dye in the resin composition for forming an optical component according to the present embodiment is, from the viewpoint of further enhancing visible light absorption properties, near-infrared light transmissibility, a refractive index increasing effect, and the like while securing moldability, preferably equal to or more than 50% by mass and equal to or less than 100% by mass, more preferably equal to or more than 60% by mass and equal to or less than 100% by mass, even more preferably equal to or more than 70% by mass and equal to or less than 100% by mass, and particularly preferably equal to or more than 80% by mass and equal to or less than 100% by mass, when the total amount of the resin composition for forming an optical component is designated as 100% by mass.

The resin composition for forming an optical component according to the present embodiment can be obtained by methods such as a method of melt-kneading raw materials including a cyclic olefin-based polymer and an anthraquinone-based dye using known kneading apparatuses such as an extruder and a Banbury mixer; a method of dissolving raw materials including a cyclic olefin-based polymer and an anthraquinone-based dye in a common solvent and then evaporating the solvent; and a method of adding a raw material solution including a cyclic olefin-based polymer and an anthraquinone-based dye to a poor solvent to cause precipitation.

(Physical Properties of Resin Composition for Forming Optical Component)

The resin composition for forming an optical component according to the present embodiment is preferably such that for a molded product formed from the resin composition for forming an optical component and having a thickness of 1 mm, the average value of transmittance at a wavelength of 850 to 1000 nm is equal to or more than 85%, and the average value of transmittance at a wavelength of 300 to 600 nm is equal to or less than 1%. Furthermore, the resin composition for forming an optical component according to the present embodiment is more preferably such that for a molded product formed from the resin composition for forming an optical component and having a thickness of 1 mm, the average value of transmittance at a wavelength of 850 to 1000 nm is equal to or more than 90%, and the average value of transmittance at a wavelength of 300 to 600 nm is equal to or less than 0.1%.

Furthermore, the resin composition for forming an optical component according to the present embodiment is such that for a molded product formed from the resin composition for forming an optical component and having a thickness of 1 mm, the transmittance at a wavelength of 850 nm is preferably equal to or more than 20%, more preferably equal to or more than 50%, and particularly preferably equal to or more than 85%.

Since the resin composition for forming an optical component according to the present embodiment is a resin composition for forming an optical component which can sufficiently cut noise by adjusting the visible light shielding properties and the near-infrared light transmissibility to be in the above-described value range and can give an optical component capable of sufficiently transmitting near-infrared light associated with sensors, for example, the optical component can be suitably used as a 3D sensor or a distance measuring sensor for measuring the shape of an object or the distance.

The transmittance of the resin composition for forming an optical component according to the present embodiment at each wavelength can be determined as follows.

First, for example, a square plate-shaped molded product formed from the resin composition for forming an optical component according to the present embodiment and having a thickness of 1 mm is obtained by injection molding. Here, the molding conditions can be set to a cylinder temperature of 275° C. and a back pressure of 3 MPa in an air atmosphere. The obtained square plate having a thickness of 1 mm is used as a sample, and transmittance is measured using an ultraviolet-visible-near-infrared spectrophotometer (for example, ultraviolet-visible-near-infrared spectrophotometer U-4150 (manufactured by Hitachi High-Tech Corporation)), at a wavelength of from 300 nm to 600 nm at an increment of 1 nm and at a wavelength of from 850 nm to 1000 nm at an increment of 1 nm. The average value of transmittance at a wavelength of 850 to 1000 nm means an arithmetic mean value of transmittance measured at a wavelength of from 850 nm to 1000 nm at an increment of 1 nm, and the transmittance at a wavelength of 300 to 600 nm represents an arithmetic mean value of transmittance measured at a wavelength of 300 nm to 600 nm at an increment of 1 nm.

The resin composition for forming an optical component according to the present embodiment is such that the refractive index at a wavelength of 830 nm of a molded product formed from the resin composition for forming an optical component is preferably equal to or more than 1.50 and equal to or less than 1.70, more preferably equal to or more than 1.50 and equal to or less than 1.60, even more preferably equal to or more than 1.53 and equal to or less than 1.57, and particularly preferably equal to or more than 1.53 and equal to or less than 1.55, at a measurement temperature of 25° C.

Furthermore, the resin composition for forming an optical component according to the present embodiment is such that the refractive index at a wavelength of 830 nm of a molded product formed from the resin composition for forming an optical component is preferably higher by equal to or more than 0.00040, and more preferably higher by equal to or more than 0.00080, than the refractive index at a wavelength of 830 nm of a molded product formed from the cyclic olefin-based polymer according to the present embodiment.

Since the resin composition for forming an optical component according to the present embodiment can give a molded product having a higher refractive index than the conventional resin compositions for forming optical components, for example, when a molded product formed from the resin composition for forming an optical component according to the present embodiment is used as a lens, the thickness of the lens can be reduced.

The refractive index at a wavelength of 830 nm of a molded product formed from the resin composition for forming an optical component and the refractive index at a wavelength of 830 nm of a molded product formed from the cyclic olefin-based polymer can be determined by the following method.

First, for example, a square plate-shaped molded product formed from the resin composition for forming an optical component according to the present embodiment and having a thickness of 3 mm and a square plate-shaped molded product formed from the cyclic olefin-based polymer and having a thickness of 3 mm are obtained by injection molding. Here, the molding conditions can be set to a cylinder temperature of 275° C. and a back pressure of 3 MPa in an air atmosphere. The obtained square plates having a thickness of 3 mm are used as samples, and the refractive index at a wavelength of 830 nm is measured at a measurement temperature of 25° C. using a refractometer (for example, refractometer KPR-3000 (manufactured by Shimadzu Corporation)).

(Molded Product)

The molded product according to the present embodiment is a molded product obtained by molding the resin composition for forming an optical component according to the present embodiment. In other words, the molded product according to the present embodiment is a molded product formed from a resin composition for forming an optical component, the resin composition including a cyclic olefin-based polymer and an anthraquinone-based dye.

As will be described later, the method for obtaining the molded product according to the present embodiment is not particularly limited; however, the molded product according to the present embodiment is preferably an injection molded product obtained by injection molding.

The molded product according to the present embodiment is preferably such that when calculated relatively to a thickness of 1 mm, the average value of transmittance at a wavelength of 850 to 1000 nm is equal to or more than 85%, and the average value of transmittance at a wavelength of 300 to 600 nm is equal to or less than 1%; and more preferably such that when calculated relatively to a thickness of 1 mm, the average value of transmittance at a wavelength of 850 to 1000 nm is equal to or more than 90%, and the average value of transmittance at a wavelength of 300 to 600 nm is equal to or less than 0.1%.

Furthermore, the molded product according to the present embodiment is such that when calculated relatively to a thickness of 1 mm, the transmittance at a wavelength of 850 nm is preferably equal to or more than 20%, more preferably equal to or more than 50%, and particularly preferably equal to or more than 85%.

Furthermore, the molded product according to the present embodiment is such that the refractive index at a wavelength of 830 nm is preferably higher by equal to or more than 0.00040, and more preferably higher by equal to or more than 0.00080, than the refractive index at a wavelength of 830 nm of a molded product formed from the cyclic olefin-based polymer according to the present embodiment.

The molded product according to the present embodiment can be used as an optical component. That is, the optical component according to the present embodiment includes the molded product according to the present embodiment. The optical component according to the present embodiment can be suitably used as, for example, an optical component such as a lens, a prism, or a light guide plate. Since the optical component according to the present embodiment has high visible light shielding properties and high near-infrared light transmissibility even without being provided with coating of a light-absorbing layer, the optical component can be used especially suitably as an optical component for use in a sensor required to detect near-infrared light, where visible light becomes noise, for example, a 3D sensor or a distance measuring sensor for measuring the shape or the distance of an object to be mounted on a smartphone or an automobile.

(Method for Manufacturing Molded Product)

The molded product according to the present embodiment can be obtained by molding the resin composition for forming an optical component according to the present embodiment into a predetermined shape. The method for obtaining a molded product by molding the resin composition for forming an optical component according to the present embodiment is not particularly limited, and any known method can be used; however, it is preferable that the resin composition for forming an optical component according to the present embodiment is molded by melt molding.

The method may depend on the use application and shape; however, for example, extrusion molding, injection molding, compression molding, inflation molding, blow molding, extrusion blow molding, injection blow molding, press molding, vacuum molding, powder slush molding, calender molding, foam molding, and the like can be applied. Among these, an injection molding method is preferred from the viewpoints of moldability and productivity. The molding conditions are appropriately selected depending on the purpose of use or the molding method; however, for example, the resin temperature in injection molding is appropriately selected in the range of usually 150° C. to 400° C., preferably 200° C. to 350° C., and more preferably 230° C. to 330° C.

The molded product according to the present embodiment can be used in various forms such as a lens shape, a spherical shape, a rod shape, a plate shape, a columnar shape, a cylindrical shape, a tubular shape, a fibrous shape, and a film or sheet shape.

If necessary, the molded product according to the present embodiment may contain known additives as optional components to the extent that favorable physical properties of the molded product according to the present embodiment are not impaired. Regarding the additives, for example, a phenolic stabilizer, a higher fatty acid metal salt, an oxidation inhibitor, an ultraviolet absorber, a hindered amine-based light stabilizer, a hydrochloric acid absorbent, a metal inactivator, an antistatic agent, an antifogging agent, a lubricating agent, a slip agent, a nucleating agent, a plasticizer, a flame retardant, and a phosphorus-based stabilizer can be incorporated to the extent that the purpose of the present invention is not impaired, and the blending proportions thereof are appropriate amounts.

When the molded product according to the present embodiment is used as an optical lens, the optical lens may be combined with an optical lens different from the above-described optical lens to form an optical lens system.

That is, the optical lens system according to the present embodiment includes a first optical lens composed of a molded product containing the resin composition according to the present embodiment, and a second optical lens different from the first optical lens.

The second optical lens is not particularly limited, and for example, an optical lens constructed by at least one resin selected from a polycarbonate resin and a polyester resin can be used.

Furthermore, the present invention is not limited to the above-described embodiments, and modifications, improvements, and the like to the extent that the object of the present invention can be achieved are to be included in the present invention.

The resin composition for forming an optical component according to a second embodiment of the present invention includes a resin and an anthraquinone-based dye and includes at least one selected from a cyclic olefin-based polymer, a polycarbonate, an acrylic resin, and a polyester, as the resin, with regard to a molded product formed from the resin composition for forming an optical component and having a thickness of 1 mm, the average value of transmittance at a wavelength of 850 to 1000 nm is equal to or more than 85%, while the average value of transmittance at a wavelength of 300 to 600 nm is equal to or less than 1%, and preferably equal to or less than 0.1%, and with regard to a molded product formed from the resin composition for forming an optical component and having a thickness of 3 mm, the refractive index at a wavelength of 830 nm is equal to or more than 1.50 and equal to or less than 1.70, preferably equal to or more than 1.50 and equal to or less than 1.60, and more preferably equal to or more than 1.53 and equal to or less than 1.57, at a measurement temperature of 25° C.

Hereinafter, each component included in the resin composition for forming an optical component according to the present embodiment will be specifically described.

The resin includes at least one selected from a cyclic olefin-based polymer, a polycarbonate, an acrylic resin, and a polyester.

As the cyclic olefin-based polymer, the same one as the above-mentioned cyclic olefin-based polymer can be used.

The structures of the polycarbonate, acrylic resin, and polyester are not particularly limited, and known resins can be used to the extent that the effects of the present invention can be exhibited.

The anthraquinone-based dye and the amount of addition thereof, other components, the physical properties of the resin composition for forming an optical component, the molded product, the method for producing the molded product, and the like are similar to those of the first embodiment described above.

EXAMPLES

Hereinafter, the present invention will be described in detail with reference to Examples; however, the present invention is not intended to be limited to the description of these Examples.

The following resins were used in the following Examples and Comparative Examples.

<Resin>

Copolymer of ethylene and a cyclic olefin (tetracyclo [$4.4.0.1^{2,5}.1^{7,10}$]-3-dodecene) (manufactured by Mitsui Chemicals, Inc., product name: APEL 5014CL; MFR: 36 g/10 min (260° C., 2.16 kg load, conforming to ASTM D1238), Tg: 135° C.)

Example 1

To pellets formed from the above-described resin, 1000 ppm of orange dye Sudan II (manufactured by Tokyo Chemical Industry Co., Ltd., azo-based, maximum absorption wavelength 500 nm) and 1000 ppm of blue dye Plast blue 8540 (manufactured by Arimoto Chemical Co., Ltd., anthraquinone-based, maximum absorption wavelength 600 nm) were added, and the mixture was subjected to extrusion kneading at 260° C. using a twin-screw extrusion kneader (manufactured by Japan Steel Works, Ltd.) to obtain a resin composition. The obtained resin composition was pelletized with a pelletizer.

The chemical formula of Sudan II is shown below.

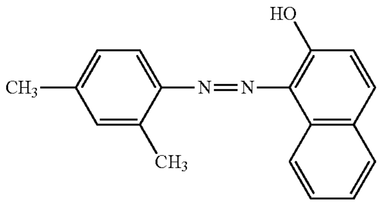 [SMILES: Cc1ccc(N=Nc2c(O)ccc3ccccc23)c(C)c1]

The chemical formula of Plast blue 8540 is shown below.

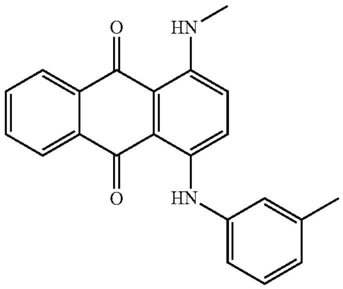 [SMILES: CNc1ccc(Nc2cccc(C)c2)c2c1C(=O)c1ccccc1C2=O]

Example 2

Pellets of the resin composition were obtained in the same manner as in Example 1, except that the amount of addition of the orange dye Sudan II was changed to 1000 ppm, and the amount of addition of the blue dye Plast blue 8540 was changed to 2000 ppm.

Example 3

Pellets of the resin composition were obtained in the same manner as in Example 1, except that the amount of addition of the orange dye Sudan II was changed to 2000 ppm, and the amount of addition of the blue dye Plast blue 8540 was changed to 1000 ppm.

Example 4

Pellets of the resin composition were obtained in the same manner as in Example 1, except that the dyes used and the amounts of addition thereof were changed to 1000 ppm of red dye PS-Red G (manufactured by Mitsui Fine Chemicals, Inc., anthraquinone-based, maximum absorption wavelength 500 nm), 2000 ppm of black dye Kayaset Black A-N (manufactured by Nippon Kayaku Co., Ltd., mixture of aminoketone-based and anthraquinone-based compounds), and 2000 ppm of green dye Solvent Green 28 (manufactured by Arimoto Chemical Co., Ltd., anthraquinone-based, maximum absorption wavelength 680 nm).

The structural formula of PS-Red G is shown below.

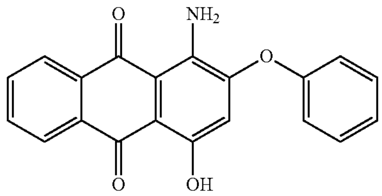 [SMILES: Nc1c(Oc2ccccc2)cc(O)c2c1C(=O)c1ccccc1C2=O]

The structural formula of Solvent Green 28 is shown below.

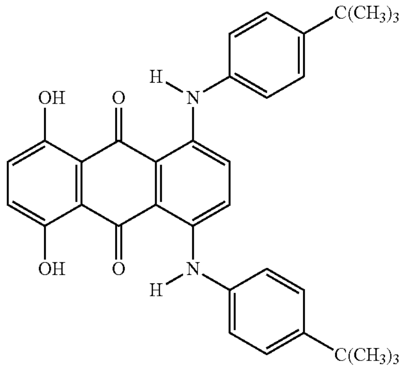 [SMILES: CC(C)(C)c1ccc(Nc2ccc(Nc3ccc(C(C)(C)C)cc3)c3c2C(=O)c2c(O)ccc(O)c2C3=O)cc1]

Example 5

Pellets of the resin composition were obtained in the same manner as in Example 1, except that the dyes used and the amounts of addition thereof were changed to 1000 ppm of orange dye Sudan II (manufactured by Tokyo Chemical Industry Co., Ltd., azo-based, maximum absorption wavelength 500 nm), 2000 ppm for blue dye Plast blue 8540 (manufactured by Arimoto Chemical Co., Ltd., anthraquinone-based, maximum absorption wavelength 600 nm), and 2000 ppm of green dye Solvent Green 28 (manufactured by Arimoto Chemical Co., Ltd., anthraquinone-based, maximum absorption wavelength 680 nm).

Example 6

Pellets of the resin composition were obtained in the same manner as in Example 1, except that the dyes used and the amounts of addition thereof were changed to 3000 ppm of black dye Kayaset Black A-N(Nippon Kayaku Co., Ltd., mixture of aminoketone-based and anthraquinone-based compounds) and 2000 ppm of green dye Solvent Green 28 (Arimoto Chemical Co., Ltd., anthraquinone-based, maximum absorption wavelength 680 nm).

Comparative Example 1

A resin composition including a copolymer (manufactured by Mitsui Chemicals, Inc., product name: APEL 5014CL) of ethylene and a cyclic olefin (tetracyclo[4.4.0.$1^{2,5}$.$1^{7,10}$]-3-dodecene) was pelletized with a pelletizer. The resin composition according to Comparative Example 1 was not subjected to addition of dyes and extrusion kneading.

Comparative Example 2

Pellets of the resin composition were obtained in the same manner as in Example 1, except that the dyes used and the amounts of addition thereof were changed to 1000 ppm of orange dye Sudan II and 1000 ppm of black dye Sudan Black B (manufactured by Tokyo Chemical Industry Co., Ltd., azo-based, maximum absorption wavelength 600 nm).

The structural formula of Sudan Black B is shown below.

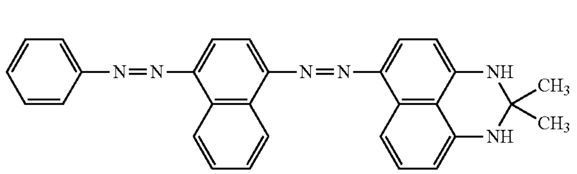 [SMILES: CC1(C)Nc2cccc3c(N=Nc4ccc(N=Nc5ccccc5)c5ccccc45)ccc(c23)N1]

The pellets obtained in each of Examples 1 to 6 and Comparative Examples 1 and 2 were injection-molded using an injection molding machine (ROBOSHOT S2000i-30α manufactured by FANUC Corporation) at a cylinder temperature of 275° C. and a back pressure of 3 MPa and were molded into a square plate having a size of 1 mm in thickness×35 mm×65 mm and a square plate having a size of 3 mm in thickness×35 mm×65 mm.

[Evaluation of Visible Light Transmittance]

Each of the obtained square plates having a size of 1 mm in thickness×35 mm×65 mm was used as a sample, transmittance thereof was measured using an ultraviolet-visible-near-infrared spectrophotometer, U-4150 (manufactured by Hitachi High-Tech Corporation), at a wavelength of from 300 nm to 600 nm at an increment of 1 nm, and the average value thereof was designated as the visible light transmittance. The obtained transmittance was evaluated according to the following criteria.

More than 1%: C

Equal to or more than 0.1% and equal to or less than 1%: B

Less than 0.1%: A

[Evaluation of Near-Infrared Light Transmittance]

Each of the obtained square plates having a size of 1 mm in thickness×35 mm×65 mm was used as a sample, transmittance thereof was measured using an ultraviolet-visible-near-infrared spectrophotometer, U-4100 (manufactured by Hitachi High-Tech Corporation), at a wavelength of from 850 nm to 1000 nm at an increment of 1 nm, and the average value thereof was designated as the near-infrared light transmittance. The obtained transmittance was evaluated according to the following criteria.

Less than 85%: C

Equal to or more than 85% and less than 90%: B

Equal to or more than 90%: A

[Evaluation of Color Unevenness]

The presence or absence of color unevenness was visually determined for the obtained square plates having a size of 3 mm in thickness×35 mm×65 mm. A square plate with color unevenness was rated as C, and a square plate without color unevenness was rated as A.

[Evaluation of Refractive Index and Amount of Increase in Refractive Index]

Each of the obtained square plates having a size of 3 mm in thickness×35 mm×65 mm was used as a sample, and the refractive index at a wavelength of 830 nm was measured at a measurement temperature of 25° C. using a refractometer KPR-3000 (manufactured by Shimadzu Corporation).

Furthermore, the amount of increase in the refractive index when compared to the case where no dye was added (Comparative Example 1) was determined. The obtained amount of increase in the refractive index was evaluated according to the following criteria.

Less than 0.0004: C

Equal to or more than 0.0004 and less than 0.0008: B

Equal to or more than 0.0008: A

[Amount of Change in Visible Light Transmittance and Amount of Change in Near-Infrared Transmittance Before and After Heat Resistance Test]

Each of the obtained square plates having a size of 1 mm in thickness×35 mm×65 mm was heated in a high temperature room at a temperature of 105° C. for 1000 hours. The visible light transmittance of each sample after a heat resistance test was measured by the above-described method, and the average value was determined. The amount of change in the visible light transmittance before and after the heat resistance test was evaluated according to the following criteria.

Equal to or more than 1: C

Equal to or more than 0.1 and less than 1: B

Less than 0.1: A

The near-infrared transmittance of each sample after the heat resistance test was measured by the above-described method, and the average value was determined. The amount of change in the near-infrared transmittance before and after the heat resistance test was evaluated according to the following criteria.

Equal to or more than 1: C

Equal to or more than 0.1 and less than 1: B

Less than 0.1: A

[Amount of Change in Visible Light Transmittance and Amount of Change in Near-Infrared Transmittance Before and After Moist Heat Resistance Test]

Each of the obtained square plates having a size of 1 mm in thickness×35 mm×65 mm was heated for 168 hours in a constant-temperature and constant-humidity chamber at a temperature of 85° C. and a humidity of 85%. The visible light transmittance of each sample after a moist heat resistance test was measured by the above-described method, and the average value was determined. The amount of change in the visible light transmittance before and after the moist heat resistance test was evaluated according to the following criteria.

Equal to or more than 1: C

Equal to or more than 0.1 and less than 1: B

Less than 0.1: A

The near-infrared transmittance of each sample after the moist heat resistance test was measured by the above-described method, and the average value was determined. The amount of change in the near-infrared transmittance before and after the moist heat resistance test was evaluated according to the following criteria.

Equal to or more than 1: C

Equal to or more than 0.1 and less than 1: B

Less than 0.1: A

[Amount of Change in Visible Light Transmittance and Amount of Change in Near-Infrared Transmittance Before and After Ultraviolet Resistance Test]

Each of the obtained square plates having a size of 1 mm in thickness×35 mm×65 mm was irradiated with ultraviolet radiation under the following conditions.

Irradiation apparatus: FALAUH (UVFade manufactured by Suga Test Instruments Co., Ltd.)

Light source: Ultraviolet carbon arc lamp

Light source output power: 500 W/$m^2$

Distance between light source and sample: 250 mm

Test temperature: 61° C.

Irradiation time: 1000 hours

The visible light transmittance of each sample after an ultraviolet resistance test was measured by the above-described method, and the average value was determined. The amount of change in the visible light transmittance before and after the ultraviolet resistance test was evaluated according to the following criteria.

Equal to or more than 1: C

Equal to or more than 0.1 and less than 1: B

Less than 0.1: A

The near-infrared transmittance of each sample after the ultraviolet resistance test was measured by the above-described method, and the average value was determined. The amount of change in the near-infrared transmittance before and after the ultraviolet resistance test was evaluated according to the following criteria.

Equal to or more than 1: C

Equal to or more than 0.1 and less than 1: B

Less than 0.1: A

TABLE 1

| | | Type and amount of dye added | | | | | | | | |
|---|---|---|---|---|---|---|---|---|---|---|
| | | Dye 1 | | | Dye 2 | | | Dye 3 | | |
| | Resin Type | | Type | Amount of addition (ppm) | | Type | Amount of addition (ppm) | | Type | Amount of addition (ppm) |
| Example 1 | APEL | Sudan II | Azo-based | 1000 | Plast Blue 8540 | Anthraquinone-based | 1000 | | — | |
| Example 2 | APEL | Sudan II | Azo-based | 1000 | Plast Blue 8540 | Anthraquinone-based | 2000 | | — | |
| Example 3 | APEL | Sudan II | Azo-based | 2000 | Plast Blue 8540 | Anthraquinone-based | 1000 | | — | |
| Example 4 | APEL | PS-Red | Anthraquinone-based | 1000 | Kayaset Black A-N | Mixture of aminoketone-based and anthraquinone-based | 2000 | Solvent Green 28 | Anthraquinone-based | 2000 |
| Example 5 | APEL | Sudan II | Azo-based | 1000 | Plast Blue 8540 | Anthraquinone-based | 2000 | Solvent Green 28 | Anthraquinone-based | 2000 |
| Example 6 | APEL | Kayaset Black A-N | Mixture of aminoketone-based and anthraquinone-based | 3000 | Plast Green 8620 | Anthraquinone-based | 2000 | | — | |
| Comparative Example 1 | APEL | | — | | | — | | | — | |
| Comparative Example 2 | APEL | Sudan II | Azo-based | 1000 | Sudan Black B | Azo-based | 1000 | | — | |

TABLE 2

| | Evaluation item | | | | | | | | | |
|---|---|---|---|---|---|---|---|---|---|---|
| | Average transmittance at wavelength of 300 to 600 nm | | Average transmittance at wavelength of 850 to 1000 nm | | Transmittance at wavelength of 850 nm | Color unevenness | Refractive index | Amount of increase in refractive index with respect to Comparative Example 1 (@830 nm) | | Heat resistance test (105° C. 1000 h) Amount of change in visible light transmittance (average at wavelength of 300 to 600 nm) |
| | (%) | Determination | (%) | Determination | (%) | Determination | at wavelength of 830 nm | (%) | Determination | (%) |
| Example 1 | 0.07 | A | 90 | A | 90.4 | A | 1.536777 | 0.00045 | B | — |
| Example 2 | 0 | A | 91 | A | 90.7 | A | 1.537222 | 0.0009 | A | −0.0013 |
| Example 3 | 0.01 | A | 90 | A | 89.3 | A | 1.537112 | 0.00079 | B | — |
| Example 4 | 0 | A | 91 | A | 90.4 | A | 1.537260 | 0.00093 | A | −0.00058 |
| Example 5 | 0 | A | 90 | A | 89.2 | A | 1.537526 | 0.0012 | A | −0.00003 |
| Example 6 | 0 | A | 91 | A | 90.3 | A | 1.537453 | 0.0011 | A | −0.00029 |
| Comparative Example 1 | 85 | C | 91 | A | 91.5 | A | 1.536327 | — | — | −5.5 |

TABLE 2-continued

| | | | | | | | | | |
|---|---|---|---|---|---|---|---|---|---|
| Comparative Example 2 | 4.64 | C | 84 | C | 81.9 | C | 1.536831 | 0.0050 | B | — |

| | Evaluation item | | | | | | | | | | |
|---|---|---|---|---|---|---|---|---|---|---|---|
| | Heat resistance test (105° C. 1000 h) | | | Moist heat resistance test (85° C. 85% 168 h) | | | | Ultraviolet resistance test (UVFade 1000 h) | | | |
| | Amount of change in visible light transmittance (average at wavelength of 300 to 600 nm) | Amount of change in near-infrared transmittance (average at wavelength of 850 to 1000 nm) | | Amount of change in visible light transmittance (average at wavelength of 300 to 600 nm) | | Amount of change in near-infrared transmittance (average at wavelength of 850 to 1000 nm) | | Amount of change in visible light transmittance (average at wavelength of 300 to 600 nm) | | Amount of change in near-infrared transmittance (average at wavelength of 850 to 1000 nm) | |
| | Determination | (%) | Determination | (%) | Determination | (%) | Determination | (%) | Determination | (%) | Determination |
| Example 1 | | — | | −0.010 | B | 0.21 | B | — | — | — | — |
| Example 2 | A | 0.37 | B | −0.00039 | A | 0.21 | B | 0.18 | B | −0.085 | A |
| Example 3 | — | — | — | 0.21 | B | 0.21 | B | — | — | — | — |
| Example 4 | A | 0.17 | B | −0.00032 | A | 0.071 | A | −0.00006 | A | −0.33 | B |
| Example 5 | A | 0.51 | B | −0.00009 | A | 0.26 | B | 0.0029 | A | 0.094 | A |
| Example 6 | A | 0.22 | B | −0.00028 | A | 0.094 | A | 0.00013 | A | −0.19 | B |
| Comparative Example 1 | C | −0.078 | A | −0.52 | B | −0.037 | A | −19.3 | C | −5.8 | C |
| Comparative Example 2 | — | — | — | −0.41 | B | 1.0 | C | — | — | — | — |

As described above, the molded bodies obtained in the Examples had high visible light shielding properties and high near-infrared transmissibility while having an excellent effect of increasing the refractive index of a molded product as compared to Comparative Example 1 to which no dye was added. On the other hand, a molded product obtained in the Comparative Example that did not include an anthraquinone-based dye was inferior to the molded bodies obtained in the Examples in view of the visible light shielding properties, the near-infrared transmissibility, and the refractive index increasing effect.

Furthermore, the molded bodies obtained in the Examples are excellent in terms of heat resistance, moist heat resistance, and ultraviolet resistance in a well-balanced manner as compared to the Comparative Examples, and the decrease in the visible light shielding effect and the decrease in the near-infrared transmittance were suppressed.

This patent application claims priority on the basis of Japanese Patent Application No. 2019-091098, filed on May 14, 2019, the disclosure of which is incorporated herein in its entirety by reference.

The invention claimed is:

1. A resin composition for forming an optical component, comprising: a cyclic olefin-based polymer and an anthraquinone-based dye, wherein the cyclic olefin-based polymer includes a copolymer, and with regard to a molded product formed from the resin composition for forming an optical component and having a thickness of 1 mm, an average value of transmittance at a wavelength of 850 to 1000 nm is equal to or more than 85%, wherein the copolymer has one kind or two or more kinds of structures represented by the following Formula (2),

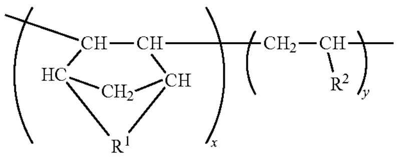

(2)

wherein in the Formula (2), $R^1$ represents a divalent group represented by the following Formula (3),

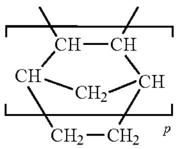

(3)

wherein p is 1, $R^2$ represents a hydrogen atom or one kind or two or more kinds of monovalent groups selected from the group consisting of hydrocarbon groups having 1 to 10 carbon atoms, and x and y represent copolymerization ratios and are real numbers satisfying the condition $5/95 \leq y/x \leq 95/5$.

2. The resin composition for forming an optical component according to claim 1, wherein with regard to a molded product formed from the resin composition for forming an optical component and having a thickness of 1 mm, an average value of transmittance at a wavelength of 300 to 600 nm is equal to or less than 1%.

3. The resin composition for forming an optical component according to claim 1, wherein with regard to a molded product formed from the resin composition for forming an optical component and having a thickness of 3 mm, a refractive index at a wavelength of 830 nm is equal to or more than 1.50 and equal to or less than 1.70 at a measurement temperature of 25° C.

4. The resin composition for forming an optical component according to claim 1, wherein the anthraquinone-based dye includes an anthraquinone-based dye having a maximum absorption wavelength in a wavelength range of 550 to 800 nm.

5. The resin composition for forming an optical component according to claim 1, wherein the anthraquinone-based dye includes a compound represented by the following General Formula (A1):

(A1)

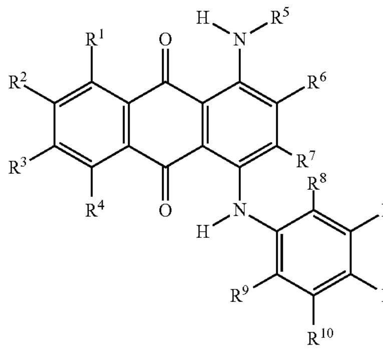

in General Formula (A1), $R^1$ to $R^{12}$ each independently represent a substituent, $R^1$ to $R^{12}$ may be the same as or different from each other and each represent a hydrogen atom, a halogen atom, an alkyl group having 1 to 20 carbon atoms, an alkyl halide group having 1 to 20 carbon atoms, a cycloalkyl group having 3 to 15 carbon atoms, an aromatic hydrocarbon group having 6 to 20 carbon atoms, a sulfo group, a sodium sulfonate group, benzenesulfonic acid, or a derivative thereof.

6. The resin composition for forming an optical component according to claim 1, wherein a content of the anthraquinone-based dye in the resin composition for forming an optical component is equal to or more than 500 ppm and equal to or less than 10000 ppm with respect to the resin composition for forming an optical component.

7. The resin composition for forming an optical component according to claim 1, wherein a refractive index at a wavelength of 830 nm of a molded product formed from the resin composition for forming an optical component is higher by equal to or more than 0.00040 than a refractive index at a wavelength of 830 nm of a molded product formed from the cyclic olefin-based polymer.

8. The resin composition for forming an optical component according to claim 1, wherein with regard to a molded product formed from the resin composition for forming an optical component and having a thickness of 1 mm, a transmittance at a wavelength of 850 nm is equal to or more than 20%.

9. A molded product obtained by molding the resin composition for forming an optical component according to claim 1.

10. An optical component comprising the molded product according to claim 9.

11. The optical component according to claim 10, wherein the optical component is a lens, a prism, or a light guide plate.

12. A resin composition for forming an optical component, the resin composition comprising a resin and an anthraquinone-based dye, wherein the resin includes a copolymer, with regard to a molded product formed from the resin composition for forming an optical component and having a thickness of 1 mm, an average value of transmittance at a wavelength of 850 to 1000 nm is equal to or more than 85%, and an average value of transmittance at a wavelength of 300 to 600 nm is equal to or less than 1%, and with regard to a molded product formed from the resin composition for forming an optical component and having a thickness of 3 mm, a refractive index at a wavelength of 830 nm is equal to or more than 1.50 and equal to or less than 1.70 at a measurement temperature of 25° C., wherein the copolymer has one kind or two or more kinds of structures represented by the following Formula (2), (2)

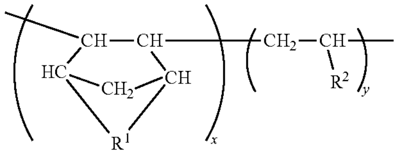

wherein in the Formula (2), $R^1$ represents a divalent group represented by the following Formula (3), (3)

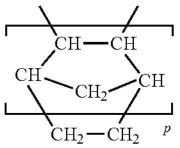

wherein p is 1, $R^2$ represents a hydrogen atom or one kind or two or more kinds of monovalent groups selected from the group consisting of hydrocarbon groups having 1 to 10 carbon atoms, and x and y represent copolymerization ratios and are real numbers satisfying the condition $5/95 \leq y/x \leq 95/5$.

13. The resin composition for forming an optical component according to claim 1, wherein the anthraquinone-based dye includes at least one selected from sodium 2-[[9,10-dihydro-4-methylamino-9,10-dioxoanthracen-1-yl]amino]-5-methyl benzenesulfonate, 1,4-bis(p-toluidino) anthraquinone, 1,4-bis(2-sodiosulfo-4-methylanilino) anthraquinone, 1,4-bis[2-(sodiosulfo)-4-butylanilino]-9,10-anthraquinone, 5,8-bis(p-butylanilino)-1,4-dihydroxyanthraquinone, and 1-methylamino-4-[(3-methylphenyl)amino]-9,10-anthraquinone.

* * * * *